Patented June 27, 1950

2,513,188

UNITED STATES PATENT OFFICE 2,513,188

MIXED PHENYLENE SULFIDE RESINS

Alexander Douglas Macallum, London, Ontario, Canada

No Drawing. Application September 10, 1948,
Serial No. 48,751

3 Claims. (Cl. 260—79)

This invention relates to novel aromatic sulfide resins, comprising condensation products of para-phenylene monosulfide, in which modification of the physical properties is effected by incorporating a proportion of trivalent benzene units into the make-up of the resin molecules.

An object of this invention is to provide an improvement over the simpler para-phenylene monosulfide resins, described in pending application Serial No. 21,562, filed April 16, 1948, particularly with respect to increasing the surface hardness of the resins and to raising their heat distortion temperatures, while retaining other useful properties of the resins, such as toughness and strength, sparing solubility, low inflammability, high stability, plasticity at high temperatures and serviceability over a wide range of conditions.

These and other objects and advantages of this invention will be apparent from the following detailed description thereof.

The mixed para-phenylene monosulfide resin products of this invention may be regarded as conforming to the empirical formula $$(C_6H_4S_x) \cdot (C_6H_3S_y)_n$$

where $x$ is equal to a value of from 1.15 to 1.25, $y$ to a value 1.5 times that of $x$, and $n$ to a value of from 0.04 to 0.25. These complex resins are to be obtained from certain mixtures of para-dichlorobenzene with lesser amounts of trichlorobenzene by means of condensation reactions involving replacement of nuclear halogen by sulfur. The discovery of valuable resins of this type is surprising, inasmuch as I have been unable to obtain any such worthwhile products from para-dichlorobenzene mixtures comprising other polychlorinated benzenes, such as tetra- or hexachlorobenzene, when similarly processed.

When rightly prepared, these mixed para-phenylene monosulfide resins can be molded by low pressure methods, at from 280° to 300° C., to produce tough, somewhat flexible, amber-colored and moderately transparent, almost insoluble, horny shapes. They have this character from below —50° C. to from 120° to 130° C. From this temperature up to from 250° to 260° C., they become rubbery and finally form chicle-like gums at temperatures above 270° C. The resins derived from mixtures comprising appreciable but not excessive amounts of trichlorobenzene retain sufficient strength while exhibiting an increased scratch hardness, to 3H or 4H by pencil test, and a raised heat distortion temperature, to 105° C. or more at a fiber stress of 264 pounds per square inch, this being presently unique among thermoplastic materials, which commonly distort at temperatures below 80° C. under the same conditions. These resins may have a Brinell hardness of 15 to 16 kilograms per square millimeter at 18° C.

More specifically, the mixed para-phenylene monosulfide resins of the present invention have a sulfur content of from 33% to 37% in the undiluted condition, and can be made by reacting mixtures of para-dichlorobenzene and 1,2,4-trichlorobenzene with sulfur and a metal sulfide, preferably produced in situ by reaction of sodium carbonate and sulfur, following a general method of synthesis for aromatic sulfides disclosed in my pending application Serial No. 5,188, filed January 29, 1948. A suitable mixture falls within the following limits: 1.1 to 1.2 parts by weight of sulfur, 3.5 to 3.7 parts of anhydrous sodium carbonate, 2.4 to 3.1 parts of para-dichlorobenzene and 0.16 to .75 part of 1,2,4-trichlorobenzene. To get a resin with the best properties, such a mixture is fused under pressure, while steadily rotating for 20 hours at 300° C.

These novel resins do not support combustion in the air; do not absorb water at ordinary temperature; are substantially insoluble in sulfur or in organic solvents at temperatures up to 150° C.—the latter include alcohols, acids, esters, ethers, ketones, hydrocarbons, halohydrocarbons, phenols, organic bases, thiophenes. The resins are practically insoluble in acids, such as hydrochloric or sulfuric acid; dissolve in hot, strongly oxidizing acids, such as nitric or chrome sulfuric acid; are practically insoluble in alkalis; are thermally stable up to and above 300° C.

Comparative physical data on several mixed para-phenylene monosulfide resins of the present invention are exhibited in the appended table, which indicates also the proportioning of the reaction mixtures as it affects the strength, surface hardness and heat distortion temperatures of the molded resins.

Table

[Showing comparative data on the properties of resins obtained from mixtures of para-dichlorobenzene, 1,2,4-trichlorobenzene, sulfur and anhydrous sodium carbonate after 20 hours' rotating under pressure at 300° C.]

|  | I | II | III | IV |
|---|---|---|---|---|
| Mixture (parts by weight): | | | | |
| p-$C_6H_4Cl_2$ | 3.3 | 3.1 | 2.7 | 2.4 |
| 1,2,4-$C_6H_3Cl_3$ | 0 | 0.16 | 0.4975 | 0.75 |
| S | 1.1 | 1.1 | 1.1 | 1.1 |
| $Na_2CO_3$ | 3.5–3.7 | 3.5 | 3.5 | 3.5 |
| Resin properties: | | | | |
| Specific gravity (at 25°/25° C.) | 1.3 | ------ | 1.356 | ------ |
| Distortion temperature (°C. at 264 lb./sq. in.) | 90 | ------ | 105 | 111.5 |
| Hardness (at 18° C.): | | | | |
| Brinell (kg./sq. mm.) | 16.1–16.2 | 15.7 | 15.7 | 15.8 |
| Scratch rating (pencil) | 1H | 1H | 3H | 4H |
| Strength (at 18° C.): | | | | |
| Tensile (1000 lb./sq. in.) | 12–12.9 | 15.5 | 9.1 | 3.1 |
| Flexural (1000 lb./sq. in.) | 13.8–14.6 | ------ | above 9 | 2.9 |
| Impact (ft. lb./in. width) | 0.29 | ------ | 0.23 | ------ |

(The average impact strength figures here are to be taken in comparison with an average of 0.185 foot pound per inch width found for commercial molded methacrylate resin under the same conditions, as determined by falling ball, using 1.5 mm. thick strips, doubly supported.)

Example

A mixture of 2.7 parts by weight of para-dichlorobenzene, 0.4975 part of 1,2,4-trichlorobenzene, 1.1 parts of sulfur and 3.5 parts of anhydrous sodium carbonate is placed in a glass tube, which is thereupon evacuated of air and sealed. The tube containing the mixture is then rotated slowly and steadily in a horizontal position for 20 hours at 300° C. On cooling and releasing the gas formed in the reaction, a tough, pale yellow resin is recovered, which is removed after warming under water. It is granulated by grinding under strong alcohol, is subsequently washed with water and dried. About 2.37 parts by weight of dry resin are recovered, which can be molded under a low pressure at about 280° C., preferably between glass plates coated with a trace of "Silicone Fluid" (polymeric organic compound containing Si—O—Si—O group and sold under the trade designation "DC 200" by Dow Corning) to prevent adhesion. The moldings are smooth, of a transparent yellow or pale amber color, have good scratch resistance, an exceptionally high heat distortion temperature, as well as quite satisfactory strength. The properties of the molded resin correspond to the data listed in column III of the appended table.

The resin can be further purified for analysis by treatment with boiling methanol and toluene in succession in a continuous extractor. After drying at 30 mm. pressure and temperatures of up to 190° C., the over all loss is about 4%. The purified resin is not substantially changed in properties and is found to contain about 35.8% by weight of sulfur and about 0.1% of chlorine.

What I claim is:

1. A thermoplastic resin having the empirical formula $(C_6H_4S_x)\cdot(C_6H_3S_y)_n$, where $x$ is equal to a value of 1.15 to 1.25, $y$ to a value 1.5 times that of $x$ and $n$ to a value of 0.04 to 0.25, which resin is a tough flexible horn at from −50° to 120°–130° C. and becomes gummy at 250°–260° C.

2. A thermoplastic resin as defined in claim 1, which resin has a Brinell hardness of from 15 to 16 kilograms per square millimeter at 18° C.

3. A thermoplastic resin as defined in claim 1, which resin has a heat distortion temperature of at least 105° C. at a fiber stress of 264 pounds per square inch and a tensile strength at 18° C. of 3100 to 15,500 pounds per square inch.

ALEXANDER DOUGLAS MACALLUM.

REFERENCES CITED

The following references are of record in the file of this patent:

UNITED STATES PATENTS

| Number | Name | Date |
| --- | --- | --- |
| 2,216,044 | Patrick | Sept. 24, 1940 |
| 2,402,977 | Patrick et al. | July 2, 1946 |
| 2,466,963 | Patrick et al. | Apr. 12, 1949 |

OTHER REFERENCES

Vorozhtzov et al.: Org. Chem. Ind. (U. S. S. R.), vol. 21, page 457 (1936) cited in Jour. Org. Chem., January 1948.